UNITED STATES PATENT OFFICE.

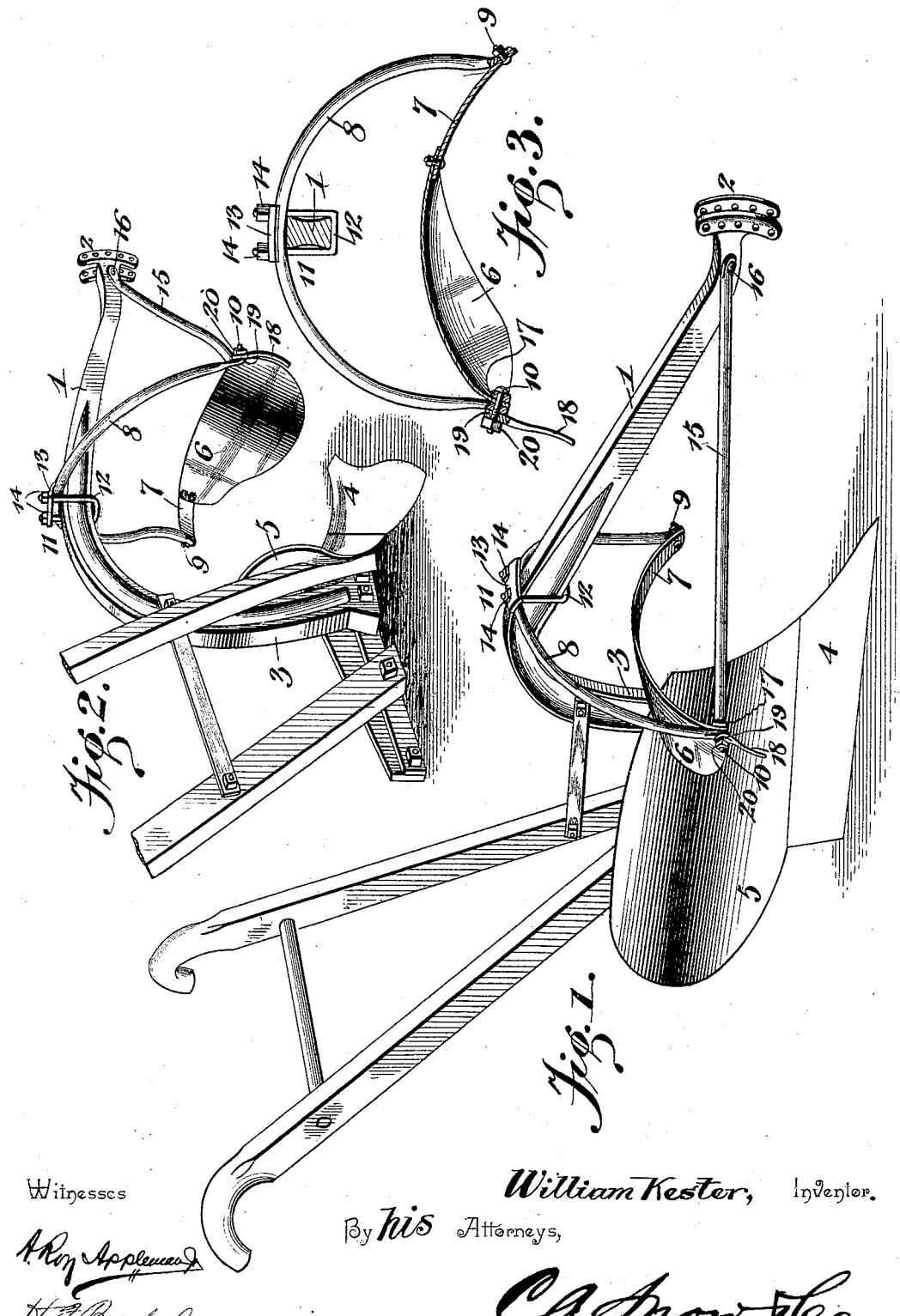

WILLIAM KESTER, OF WASHINGTON MILLS, IOWA.

TURNING ATTACHMENT FOR PLOWS.

SPECIFICATION forming part of Letters Patent No. 620,329, dated February 28, 1899.

Application filed July 30, 1898. Serial No. 687,306. (No model.)

*To all whom it may concern:*

Be it known that I, WILLIAM KESTER, a citizen of the United States, residing at Washington Mills, in the county of Dubuque and State of Iowa, have invented a new and useful Turning Attachment for Plows, of which the following is a specification.

My invention relates to a turning attachment for plows; and the prime object of the invention is to provide means by which a cornfield may be plowed to turn under the standing stalks and other objectionable growths without the necessity for cutting down the stalks preliminary to plowing the field.

A further object of the invention is to provide an attachment which may be used on plows of different kinds employing either metallic or wooden beams, and said attachment is mounted to be adjustable toward or from the moldboard, so as to deflect the stalks more or less in advance of the plowshare, according to the height or nature of the stalks.

With these ends in view the invention consists in the combination of an arched suspension-bar adapted to be clamped to a plow-beam and a fender mounted in said arch to be suspended thereby in advance of the moldboard.

The invention further consists in mounting the fender for adjustment within the suspension-arch toward or from the moldboard; and it finally consists in the novel combination of elements and in the construction and arrangement of parts, as will be hereinafter more fully described and claimed.

To enable others to understand the invention, I have illustrated the preferred embodiment thereof in the accompanying drawings, forming a part of this specification, and in which—

Figure 1 is a perspective view of a plow looking from the front toward the rear thereof and illustrating the turning attachment applied in operative position to the beam. Fig. 2 is a perspective view looking from the rear toward the front of the plow, with the turning attachment adjusted to a different position. Fig. 3 is a vertical transverse section through the turning attachment and the beam, illustrating the means for clamping the suspension-arch to the beam.

Like numerals of reference denote like and corresponding parts in each of the several figures of the drawings.

In order that others skilled in the art may understand my invention, I have illustrated it in the accompanying drawings as applied to an ordinary plow, and by reference to Figs. 1 and 2 it will be seen that the plow-beam is designated by the numeral 1, the clevis at 2, the standard or foot at 3, the share at 4, and the moldboard at 5. The plow represented by the drawings has a metallic beam; but my improvement is designed to be used on plows having wooden beams, and, in fact, I contemplate applying such attachment to all manner or classes of plows, including gang-plows and sulky-plows, which by the addition of the attachment are well adapted for plowing corn-fields having standing stalks, so as to turn the stalks, with the soil, into the furrows.

My attachment consists of a fender 6, adapted to be used in connection with means for suspending the fender on the plow-beam in advance of the moldboard, and a stay to hold the suspension means and fender in their adjusted positions and to prevent them from being deflected or turned out of operative relation to the moldboard by the resistance of the cornstalks which are encountered and turned over by the fender as the implement is drawn across the field.

The fender which I employ is a metallic structure, preferably of the curved form illustrated by the drawings—that is to say, the fender is curved longitudinally and it is arched transversely. The fender is preferably wider at one end than at the other, although this is not material, and said fender may be made of heavy sheet metal or it may be of cast metal. To the inner narrow end of the fender is rigidly secured an arm 7, which extends or projects beyond the fender and is secured firmly thereto in a suitable way—as, for instance, by bolts, as shown by Fig. 3.

The means which I prefer to employ for supporting the fender consists of an arch 8, herein illustrated as a piece of metal bent to the proper form and arranged to fit over the plow-beam 1, so as to have its free ends extend downwardly from the beam and lie on opposite sides of the same. The suspension-arch and the fender are joined together by bolts 9 10, which serve to properly attach the fender to the arch and provide means on which the fender may be rocked or tilted for the purpose of adjusting the fender to the desired position. The ends of the arch are adapted to overlap one end of the fender and the arm 7 at the opposite end of said fender, and the bolt 9 passes through the arm 7 and one end of the arch 8, so as to firmly clamp the parts together. The other bolt 10 passes through the fender and the arch as well as through the stay-rod and a guard-arm, which will hereinafter be more specifically described.

From the foregoing description it will be seen that the suspension-arch is adapted to straddle the plow-beam and support the arched fender in an elevated position with relation to and in advance of the moldboard of the plow, and to firmly hold these parts in their position I provide a clamp 11, by which the arch is firmly held to the beam, and a stay-rod 15 to strengthen the arch and fender at their outer ends, which stay-rod reinforces the fender and prevents deflection thereof, owing to the resistance of the stalks which are encountered by the fender in the operation of the implement.

As shown by the drawings, the clamp 11 consists of a U-shaped clip 12, a binding-plate 13, and the nuts 14. The clip 12 is applied to the plow-beam to have the threaded legs thereof lie on opposite sides of the beam, and the plate 13 is fitted to the top side of the beam for the threaded legs of the clip to pass through transverse openings in said plate. The plate 13 fits over that part of the suspension-arch which straddles the beam, and by tightening the nuts 14 on the threaded legs of the clip the members of the clip and the suspension-arch are bound firmly together to maintain the arch in rigid relation to the plow-beam.

The stay-rod 15 occupies the diagonal position to the plow-beam, and the front end of said rod is fastened detachably to the beam, at or near the clevis thereon, by a bolt 16. The rear end of this stay-rod is flattened to form an ear or plate 17, which is arranged to bear against the inner side of the fender at the outer end thereof, and through this plate-like end of the stay-rod passes the bolt 10, which thus serves to attach the rear end of the stay to the fender.

To prevent the cornstalks from lifting after they shall have been turned with the soil and to keep the stalks depressed in the furrow, I employ a depending guard-arm 18, which is attached to the outer end of the fender by the bolt 10, that serves to attach the arch and stay to the fender. This guard-arm is inclined in a rearward and downward direction from the fender, so as to depend below the same, and as a convenient means for attaching the arm to the fender the upper end of said arm is flattened into a plate or ear 19, which is perforated for the passage of the bolt 10 and so that the nut 20 of said bolt may bear firmly against the arm and thereby draw all the parts of the attachment firmly together.

In applying my fender to a plow the arch is adjusted across the beam and the fender is attached by the bolts 9 10 to the arch. The stay and guard-arm are fastened to the outer end of the fender by the bolt 10, and the clip and bolt 16 are fastened on the beam to firmly hold the arch and stay in place thereon. The arch and stay securely hold the fender in the adjusted position in advance of the moldboard; but the nuts on the bolts 9 10 may be loosened for the purpose of permitting the operator to tilt the fender closer to or farther from the moldboard. By moving the fender in a rearward direction on the bolts 9 10, so as to bring the fender closer to the moldboard, the stalks are not deflected to such a great extent as when the fender is thrown in a forward direction; but by adjusting the fender to assume a substantially horizontal position, as indicated by Fig. 1, the front edge of the fender is brought to act against the stalks and turn the latter forward and downward in advance of the moldboard, so that the stalks, with the soil, may be turned into the furrow by the action of the plow. The guard-arm 18 may readily be adjusted to the desired inclination, and it is adapted to be firmly clamped in place by the bolt 10.

My attachment obviates the necessity for cutting down the cornstalks preliminary to plowing the field, and it thus saves the farmer the expense of a separate machine, as well as the time and labor of operating the machine. The attachment is especially useful when plowing fields with standing stalks, and practical service of a plow equipped with my attachment has demonstrated that it operates efficiently in a field having tall stalks. The attachment is simple and durable in construction, efficient in operation, and readily applicable to any and all classes of plows.

Changes may be made in the form of some of the parts while their essential features are retained and the spirit of the invention embodied. Hence I do not desire to be limited to the precise form of all the parts as shown, reserving the right to vary therefrom.

Having thus described the invention, what is claimed as new is—

1. A weed-turning attachment for plows, comprising a suspension-arch arranged to straddle a plow-beam, a fender arranged between the ends of and attached to the suspension-arch and adapted to be sustained thereby in a substantially horizontal position in advance of the plow-moldboard, and means for clamping the suspension-arch on a plow-beam, substantially as described.

2. In a turning attachment for plows, the combination of a suspension bar or arch arranged to straddle a plow-beam and held firmly thereon, an arched fender adjustably supported between the ends of the bar or arch and movable therein toward or from the moldboard, and means for clamping the fender firmly in place within the bar or arch, substantially as described.

3. In a turning attachment for plows, the combination of a suspension bar or arch, a curved fender arranged between the ends of said suspension-bar, and bolts which adjustably attach the fender to the suspension-bar and serve to hold said fender firmly in position therein, substantially as described.

4. In a turning attachment for plows, the combination of an arched suspension-bar, an arched fender adjustably held therein, and a stay attached to the fender and adapted for connection with a plow-beam, substantially as described.

5. In a turning attachment for plows, the combination of a suspension-bar, a fender secured thereto, and a depending guard-arm attached to one end of the fender, substantially as described.

6. A turning attachment for plows comprising a suspension-bar having means for fastening it to a plow-beam, a fender fastened to the suspension-bar, a stay-rod, a depending guard-arm at the outer end of the fender, and means for fastening the arm and stay to the fender and suspension-bar, substantially as described.

7. The combination with a plow, of a suspension-arch arranged to straddle the beam, a clamp attached to the beam and engaging with the suspension-arch to firmly hold the latter in place on said beam, a fender attached to the arch at or near the ends thereof, and a stay between the outer end of the fender and the beam, substantially as described.

8. In a turning attachment for plows, the combination with a beam, of an adjustable suspension-bar which straddles the beam, a fender pivoted on the suspension-bar and adjustable thereon toward or from the plow-moldboard, and clamping devices for holding the fender firmly in its adjusted position on said bar, substantially as described.

In testimony that I claim the foregoing as my own I have hereto affixed my signature in the presence of two witnesses.

WM. KESTER.

Witnesses:
   CHAS. F. SMYTH,
   DENNIS MCDONNELL.